Patented Aug. 16, 1932

1,871,513

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

AZO-(2.3 HYDROXY-NAPHTHOYL)-AROMATIC DIAMINES AND AZO DYESTUFFS DERIVED THEREFROM

No Drawing. Application filed June 27, 1929. Serial No. 374,284.

My invention relates to new azo-arylamide derivatives of 2,3-hydroxy-naphthoic acid, as well as to direct-developed polyazo dyestuffs derived therefrom by coupling with suitable diazotized or tetrazotized aryl-amino compounds.

In a pending application Serial No. 358,756, filed April 27, 1929, I have described certain new compounds comprising azo-arylides of 2,3-hydroxy-naphthoic acid and azo dyestuffs derived therefrom, the aforesaid azo-arylides being formed by condensing a mono-amino-azo compound with 2.3-hydroxy-naphthoic acid in equimolecular proportion. I have now found that complex azo-arylides of related character may be prepared by condensing an azo-diamine with 2 moles of 2,3-hydroxy-naphthoic acid, the compounds so produced constituting new and useful intermediate products from which azo dyes of excellent fastness to light and washing may be prepared by coupling with suitable diazotized or tetrazotized arylamines. The invention, then, consists of the aforesaid new intermediate compounds and azo dyestuffs derived therefrom, together with the methods for the preparation thereof, as hereinafter fully described and particularly pointed out in the claims, the following description setting forth detailed procedure representative of various ways in which the principle of the invention may be used.

The herein described new intermediate compounds, comprising poly-(2,3-hydroxy-naphthoyl) derivatives of mono- or disazo aromatic diamines, have the following general formula:

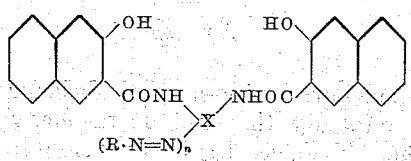

wherein X represents the residue of an aromatic diamine, R an aryl residue or residues which may be further substituted, and $n$ is the integer 1 or 2. When $n$ is 2, R may represent either the same or different aryl residues, either one or both of which may be further substituted or not, as desired, by other monovalent groups, such as halogen, nitro, amino, azo groups, etc. and such substituent groups may be substituted still further when possible. For example, an amino substituent group may itself be substituted, as by alkyl, aryl or acyl groups. The aforesaid aromatic diamine component may be mono-nuclear, such as phenylene diamine, or multi-nuclear, such as benzidine, diphenylene, etc., or condensed-nuclear, such as naphthylene diamine.

The new azo dyestuffs are prepared by coupling the aforesaid azo-bis-(2,3-hydroxy-naphthoyl) aromatic diamines with diazotized or tetrazotized arylamino compounds in the usual way. Said dyestuffs dye cotton directly in a wide range of colors varying from orange to deep blue and black and in remarkably clear and brilliant tones which are very fast to light and washing. They are advantageously applied by developing on the fibre, but may also be produced in substance or deposited upon the usual substrata to form lakes, in which forms they are useful pigments.

A preferred mode of procedure for carrying out the invention is illustrated in the following specific examples, but it is understood that such examples are not to be interpreted as a limitation upon the invention.

*Example 1*

2 moles meta-nitraniline are diazotized and coupled with 1 mole meta-phenylene diamine. The disazo-diamine product is then condensed with 2 moles 2,3-hydroxy-naphthoic acid by heating the two compounds dissolved or suspended in toluene, or other suitable solvent having about the same boiling point, with addition of a small amount of phosphorus trichloride, the heating being carried out under reflux for from 3 to 5 hours. The reaction product is then neutralized with sodium carbonate and the toluene distilled off with steam. The desired compound, bis-(meta-nitrobenzene)-disazo-bis-(2,3-hydroxy-naphthoyl) meta-phenylene-diamine, remains in suspension in the residual aqueous solution, and is filtered therefrom and washed with water. The product is purified by dissolving in dilute, 1 to 2 per cent., caustic alkali solution, filtering from unreacted disazo-diamine and reprecipitating by acidification of the alkaline solution. The intermediate compound so produced has the formula;

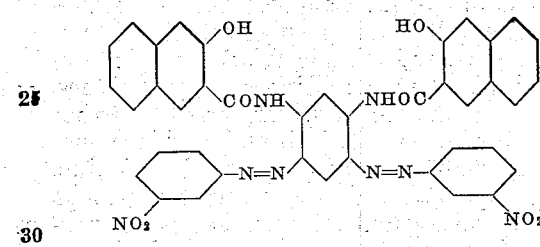

Cotton material is impregnated with a slightly alkaline solution of the above intermediate compound to which a small amount of formaldehyde may be advantageously added and, if desired, Turkey red oil or other agent to facilitate the absorption of the compound by the fiber. The impregnated material is then immersed in a cold solution of sodium acetate or carbonate and the dye developed by adding a diazo solution prepared from 2 moles meta-nitraniline. The color is a bright orange-salmon. The dyestuff has the formula;

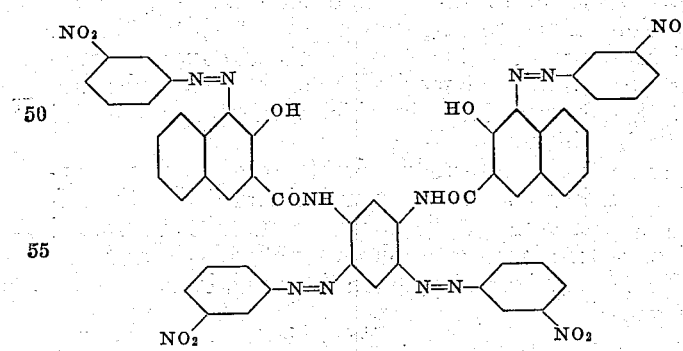

*Example 2*

In similar manner to Example 1, one mole para-phenetidine is diazotized and coupled with one mole meta-phenylene diamine and the resultant azo-diamine is condensed with two moles 2,3-hydroxy-naphthoic acid. The intermediate product so prepared is then coupled on the fiber with 2 moles alpha-naphthylamine, the color resulting being a deep shade of maroon. The dyestuff has probably the formula:

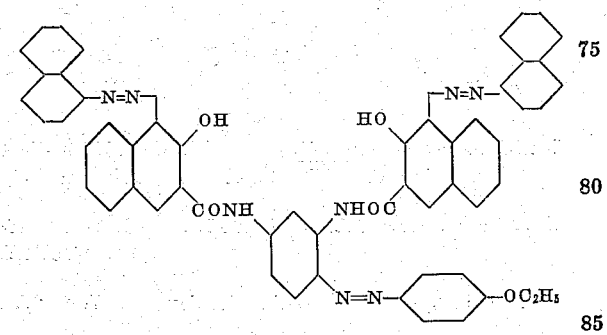

*Example 3*

1 mole alpha-naphthylamine is diazotized and coupled with 1 mole meta-phenylene diamine, the azo diamine is condensed with 2 moles 2,3-hydroxy-naphthoic acid and the intermediate product so formed is coupled on the fiber with 1 mole dianisidine. The color is a clear shade of blue. The dyestuff has probably the formula;

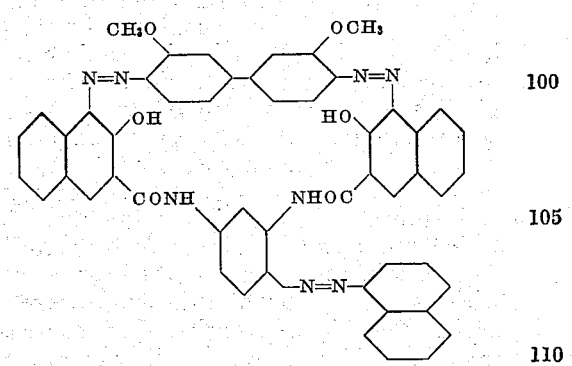

*Example 4*

1 mole para-amino-acetanilide is diazotized and coupled with 1 mole meta-phenylene diamine. The acetyl group is removed by saponifying and the resultant tri-amino compound is condensed with 3 moles 2,3-hydroxy-naphthoic acid. The intermediate compound resulting from such condensation is then coupled on the fiber with 3 moles para-amino-acetanilide, the color being a clear, light rose-pink. The dyestuff has probably the formula;

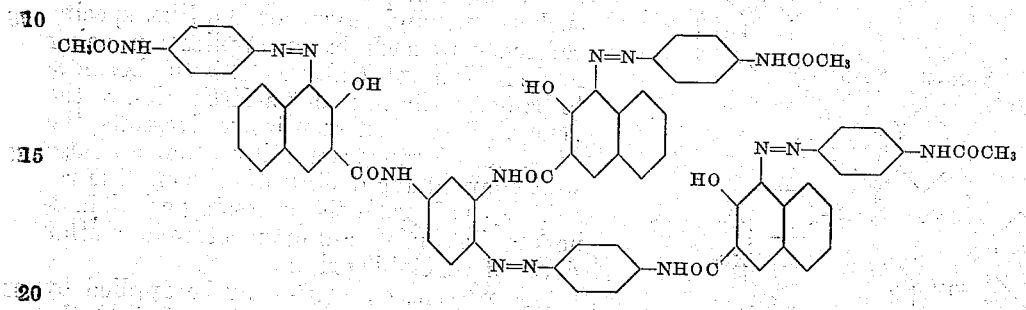

*Example 5*

1 mole benzidine is tetrazotized and coupled with 2 moles meta-phenylene diamine and the product condensed with 4 moles, 2,3-hydroxy-naphthoic acid. The intermediate product so formed is then coupled on the fiber with 4 moles 1-amino-naphthyl-4-phenyl ether, the color being a medium shade of lavender-violet. The dyestuff has probably the formula;

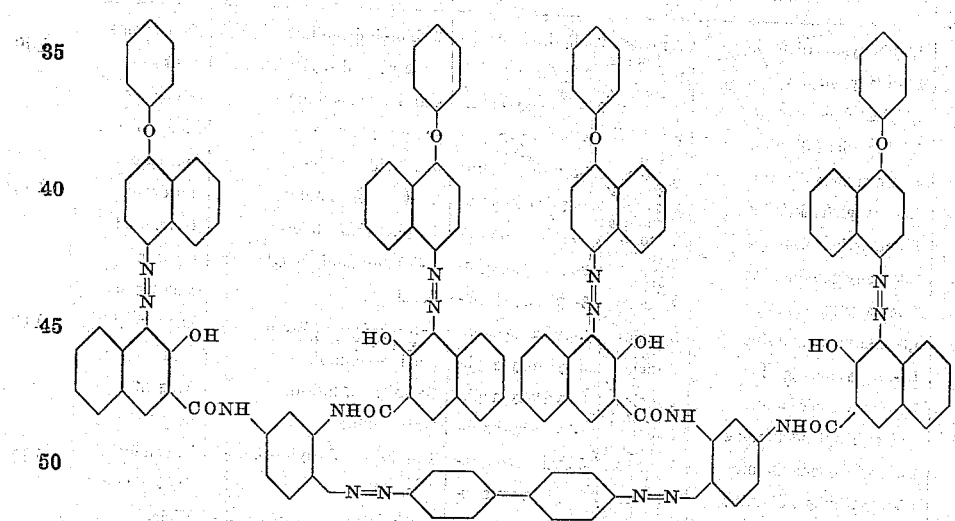

*Example 6*

2 moles meta-nitraniline are diazotized and coupled with 1 mole 1,5-naphthylene diamine and the product condensed with 2 moles 2,3-hydroxy-naphthoic acid. The intermediate product is then coupled on the fiber with 2 moles ortho-amino-diphenyl ether, the color developed being a bright eosine pink. It is to be noted that the latter dye shows an especially strong affinity for synthetic nitro-cellulose fibers, such as rayon.

The dyestuff has probably the formula;

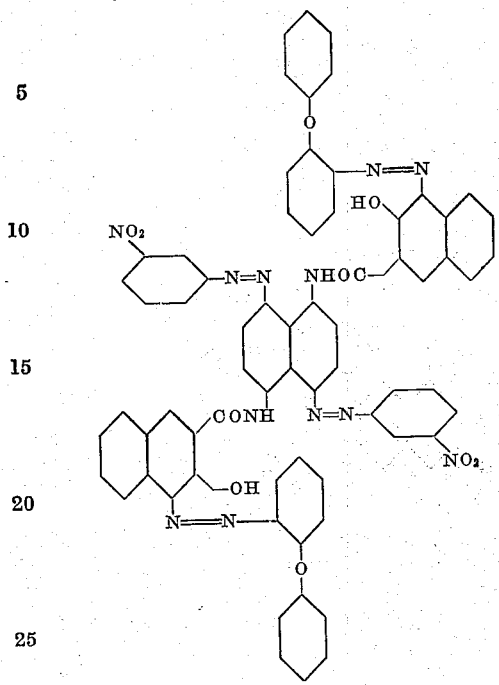

In similar fashion other dyestuffs may be prepared by coupling other diazotized or tetrazotized arylamino compounds with the same or other poly-(2, 3-hydroxy-naphthoyl) derivatives of mono-azo- or disazo-aromatic diamines. The components employed for, and the colors produced by, several of such similar dyeings are given in the accompanying table.

Although in the detailed Example 1 the cotton fiber is specifically referred to as a material upon which the present dyes may be developed, my new dyestuffs are also capable of dyeing other natural or synthetic fibers, such as silk and rayon, or the like, specific reference to such latter application being made in Example 6 above. It is furthermore to be noted that, in contra-distinction to the general class of substantiative dyestuffs, the dyestuffs of the present invention are also well adapted for dyeing wool fibers, the resulting dyed products possessing equal fastness to those produced upon cotton or similar fibers of vegetable origin.

The present dyestuffs may be applied by developing on the fiber or not, as desired, the invention being independent of the particular mode of application employed. Auxiliary treatments for fixing or for aiding the absorption of the dyestuff by the fiber may be utilized optionally in connection with the dyeing process without departing from the spirit of the invention which comprehends not only the new dyestuffs of the general type herein described but also materials dyed therewith.

| Arylide component | | | Diazo component | Color |
|---|---|---|---|---|
| Diazo compound of— | Coupled with— | Product condensed with— | | |
| 2 moles 3-nitraniline | 1,3-phenylene diamine | 2 moles 2,3-hydroxy-naphthoic acid | 2-chlor-4-nitraniline | Red orange |
| 2 moles 3-nitraniline | 1,3-phenylene diamine | 2 moles 2,3-hydroxy-naphthoic acid | 2-amino-diphenyl ether | Pink |
| 1 mole 3-nitraniline | 1,3-phenylene diamine | 2 moles 2,3-hydroxy-naphthoic acid | 4-amino-acetanilide | Violet red |
| 1 mole 3-nitraniline | 1,3-phenylene diamine | 2 moles 2,3-hydroxy-naphthoic acid | -naphthylamine | Red violet |
| 1 mole 4-phenetidine | 1,3-phenylene diamine | 2 moles 2,3-hydroxy-naphthoic acid | 3,4-dichloraniline | Henna red |
| 1 mole 4-phenetidine | 1,3-phenylene diamine | 2 moles 2,3-hydroxy-naphthoic acid | 2-nitro-4-phenetidine | Bordeaux |
| 1 mole-naphthylamine | 1,3-phenylene diamine | 2 moles 2,3-hydroxy-naphthoic acid | 1,3-phenylene diamine | Henna red |
| 1 mole-naphthylamine | 1,3-phenylene diamine | 2 moles 2,3-hydroxy-naphthoic acid | 4,4'-diamino diphenyl ether | Carmine |
| 2 moles 4-phenetidine | 1,3-phenylene diamine | 2 moles 2,3-hydroxy-naphthoic acid | benzidine | Red violet |
| 2 moles 4-phenetidine | 1,3-phenylene diamine | 2 moles 2,3-hydroxy-naphthoic acid | 2-nitro-4-phenetidine-azo--naphthylamine | Dark gray |
| 2 moles-naphthylamine | 1,3-phenylene diamine | 2 moles 2,3-hydroxy-naphthoic acid | 2-chlor-4-toluidine | Red |
| 2 moles-naphthylamine | 1,3-phenylene diamine | 2 moles 2,3-hydroxy-naphthoic acid | 1-phenyl-2,5-anisidine | Magenta |
| 2 moles 3-nitraniline | 1,5-naphthylene diamine | 2 moles 2,3-hydroxy-naphthoic acid | 3-nitraniline | Orange |
| 2 moles 3-nitraniline | 1,5-naphthylene diamine | 2 moles 2,3-hydroxy-naphthoic acid | 1-amino-naphthyl-4-phenyl ether | Lavender |
| 2 moles 3-nitraniline | 1,5-naphthylene diamine | 2 moles 2,3-hydroxy-naphthoic acid | dianisidine | Dark blue |
| 2 moles 3-nitraniline | 1,5-naphthylene diamine | 2 moles 2,3-hydroxy-naphthoic acid | 3-nitro-benzene-azo--naphthylamine | Violet |
| 1 mole benzidine | (2) 1,3-phenylene diamine | 4 moles 2,3-hydroxy-naphthoic acid | 2-chlor-4-nitraniline | Copper red |
| 1 mole benzidine | (2) 1,3-phenylene diamine | 4 moles 2,3-hydroxy-naphthoic acid | 2-amino-diphenyl ether | Scarlet |
| 1 mole benzidine | (2) 1,3-phenylene diamine | 4 moles 2,3-hydroxy-naphthoic acid | dianisidine | Blue |
| 1 mole benzidine | (2) 1,3-phenylene diamine | 4 moles 2,3-hydroxy-naphthoic acid | 4-nitrobenzene-azo-2-toluidine | Reddish brown |
| 1 mole 4-amino-acetanilide | 1,3-phenylene diamine | 3 moles 2,3-hydroxy-naphthoic acid | 3-nitraniline | Salmon |
| 1 mole 4-amino-acetanilide | 1,3-phenylene diamine | 3 moles 2,3-hydroxy-naphthoic acid | -naphthylamine | Pink |
| 1 mole 4-amino-acetanilide | 1,3-phenylene diamine | 3 moles 2,3-hydroxy-naphthoic acid | 4-phenetol-azo--naphthylamine | Gray |

In carrying out the invention for producing the present new azo dyestuffs, the result is, of course, equivalent whether two moles of a diazotized aryl-mono-amine or one mole of a tetrazotized diamine are employed for coupling with an intermediate product derived from 2,3-hydroxy-naphthoic acid of the type herein described.

Other modes of applying the principle of my invention may be employed instead of the one explained, change being made as regards the steps or materials employed, provided the steps or ingredients stated by any of the following claims or the equivalent of such stated steps or ingredients be employed.

I therefore particularly point out and distinctly claim as my invention:—

1. The method of making a new azo compound which comprises coupling any diazotized aromatic amine of the benzene, naphthalene or diphenyl series with an aromatic diamine of the group consisting of the benzene, naphthalene, diphenyl, and diphenylene series and condensing the thereby formed azo-diamine with two molecular equivalents of 2.3-hydroxynaphthoic acid.

2. The method of making a new azo dye which comprises coupling any diazotized aromatic amine of the benzene, naphthalene or diphenyl series with an aromatic diamine of the group consisting of the benzene, naphthalene, diphenyl, and diphenylene series, condensing the thereby formed azo-diamine with two molecular equivalents of 2.3-hydroxynaphthoic acid and then coupling the obtained intermediate compound with a diazotized aromatic amine.

3. As a new compound, the condensation product of an azo-aromatic-diamine with 2 molecular equivalents of 2,3-hydroxy-naphthoic acid, having the general formula;

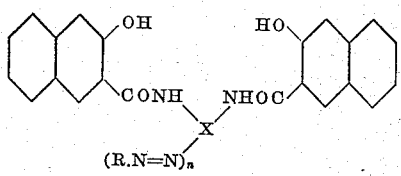

in which X is the residue of an aromatic diamine of the benzene, naphthalene, diphenyl, and diphenylene series, R is an aryl residue of the benzene, naphthalene, or diphenyl series which may be further substituted by one or more of the following groups:—halogen, nitro, alkoxy, 2-hydroxy-3-naphthoyl-amino and an aryl-azo group of the benzene or naphthalene series, and wherein $n$ represents the integer 1 or 2.

4. As new compounds, the condensation product of a disazo-aromatic-diamine with 2 molecular equivalents of 2,3-hydroxy-naphthoic acid, having the general formula;

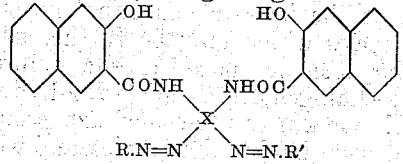

in which X is the residue of an aromatic diamine of the benzene, naphthalene, diphenyl, an diphenylene series and R and R' are aryl residues of the benzene, naphthalene, or diphenyl series which may be further substituted by one or more of the following groups:—halogen, nitro, alkoxy, 2-hydroxy-3-naphthoylamino and an aryl-azo group of the benzene or naphthalene series.

5. As a new compound, the condensation product of an azo-meta-phenylene diamine with 2 molecular equivalents of 2,3-hydroxy-naphthoic acid, having the general formula;

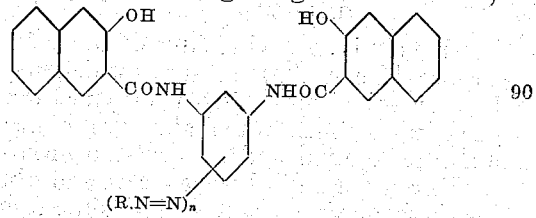

in which R is an aryl residue of the benzene, naphthalene, or diphenyl series which may be further substituted by one or more of the following groups:—halogen, nitro, alkoxy, 2-hydroxy-3-naphthoylamino and an aryl-azo group of the benzene or naphthalene series, and wherein $n$ represents the integer 1 or 2.

6. As a new compound, the condensation product of a disazo-meta-phenylene diamine with 2 molecular equivalents of 2,3-hydroxy-naphthoic acid, having the general formula;

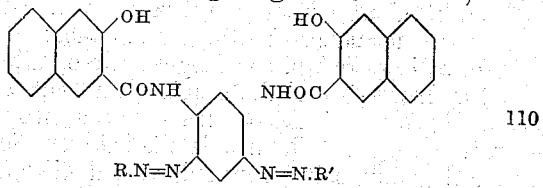

in which R and R' are aryl residues of the benzene, naphthalene, or diphenyl series which may be further substituted by one or more of the following groups:—halogen, nitro, alkoxy, 2-hydroxy-3-naphthoylamino, and an aryl-azo group of the benzene or naphthalene series.

7. As a new compound, an azo dyestuff having probably the general formula;

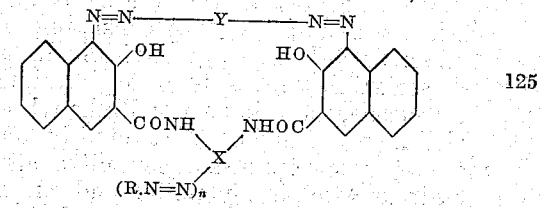

in which X is the residue of an aromatic diamine of the benzene, naphthalene, diphenyl or diphenylene series, R is an aryl residue of the benzene, naphthalene or diphenyl series which may be further substituted by one or more of the following groups:—halogen, nitro, alkoxy, 2-hydroxy-3-naphthoylamino and an aryl-azo group of the benzene or naphthalene series, and wherein n is the integer 1 or 2, and Y is the residue of a tetrazotized aromatic diamino compound.

8. As a new compound, an azo dyestuff having probably the general formula;

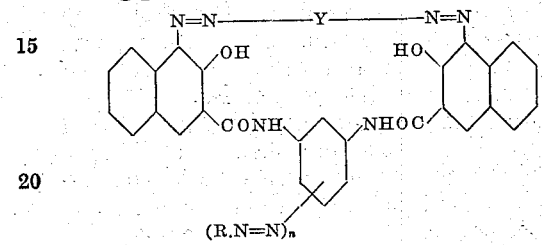

in which R is an aryl residue of the benzene, naphthalene or diphenyl series which may be further substituted by one or more of the groups:—halogen, nitro, alkoxy, 2-hydroxy-3-napthoylamino and an aryl-azo group of the benzene or naphthalene series, and wherein n is the integer 1 or 2, and Y is the residue of a tetrazotized aromatic diamino compound.

9. As a new compound, an azo dyestuff characterized by the group

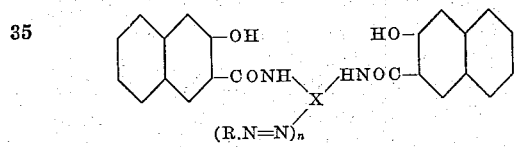

in which R is an aryl residue of the benzene, naphthalene, or diphenyl series which may be further substituted by one or more of the following groups:—halogen, nitro, alkoxy, 2-hydroxy-3-naphthoylamino and an aryl-azo group of the benzene or naphthalene series, and in which n is the integer 1 or 2, said group being coupled with a diazotized aromatic amino compound.

10. As a new compound, an azo dye having probably the general formula,

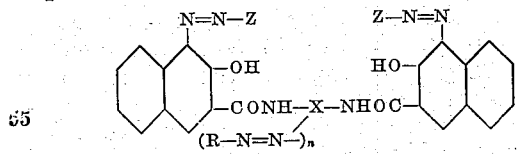

wherein X represents the residue of an aromatic diamine of the group consisting of the benzene, naphthalene, diphenyl, and diphenylene series, R represents an aryl residue of the benzene, naphthalene or diphenyl series which may be further substituted by one or more of the groups:—halogen, nitro, alkoxy, 2-hydroxy-3-naphthoylamino and an aryl-azo group of the benzene or naphthalene series, Z represents the residue of a diazotized aromatic amino compound, and wherein n is the integer 1 or 2.

11. As a new compound, an azo dye having probably the general formula,

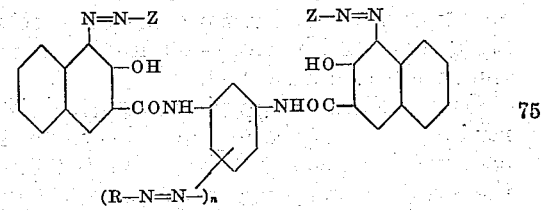

wherein R represents an aryl residue of the benzene, napthalene or diphenyl series which may be further substituted by one or more of the following groups:—halogen, nitro, alkoxy, 2-hydroxy-3-naphthoylamino and an aryl-azo group of the benzene or naphthalene series, Z represents the residue of a diazotized aromatic amino compound and wherein n is the integer 1 or 2.

12. As a new compound, an azo dyestuff characterized by the group

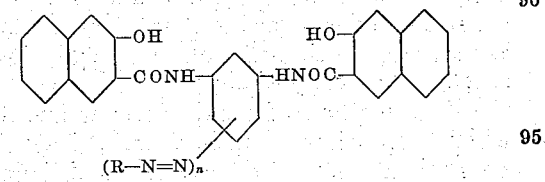

in which R is an aryl residue of the benzene, naphthalene, or diphenyl series which may be further substituted by one or more of the following groups:—halogen, nitro, alkoxy, 2-hydroxy-3-naphthoylamino and an aryl-azo group of the benzene or naphthalene series, and in which n is the integer 1 or 2, said group being coupled with a diazotized aromatic amino compound.

Signed by me this 24th day of June, 1929.

ERNEST F. GRETHER.